United States Patent [19]
Ramer et al.

[11] Patent Number: 5,705,804
[45] Date of Patent: Jan. 6, 1998

[54] QUADRANT LIGHT DETECTOR

[75] Inventors: David P. Ramer, Dayton, Ohio; Jack C. Rains, Jr., Herndon, Va.

[73] Assignee: Science Applications International Corporation, San Diego, Calif.

[21] Appl. No.: 589,104

[22] Filed: Jan. 23, 1996

[51] Int. Cl.$^6$ ............................................. G01B 11/00
[52] U.S. Cl. ........................... 250/206.1; 250/203.3; 356/121
[58] Field of Search .......................... 356/121, 375, 356/139.01; 250/203.1, 203.3, 203.4, 203.6, 206.1

[56] References Cited

U.S. PATENT DOCUMENTS

| | | |
|---|---|---|
| 1,267,967 | 5/1918 | Brunnworth et al. . |
| 1,640,448 | 8/1927 | Halvorson, Jr. . |
| 1,676,463 | 7/1928 | Ryan . |
| 2,469,412 | 5/1949 | Roebken . |
| 2,969,018 | 1/1961 | Erst et al. ............... 250/203.1 |
| 3,637,309 | 1/1972 | Hosterman . |
| 3,772,506 | 11/1973 | Junginger . |
| 3,777,160 | 12/1973 | Bernt ......................... 250/203.1 |
| 3,809,911 | 5/1974 | Natens . |
| 3,968,363 | 7/1976 | Mielenz et al. . |
| 4,027,161 | 5/1977 | Williams et al. . |
| 4,144,556 | 3/1979 | Bond . |
| 4,309,746 | 1/1982 | Rushworth . |
| 4,443,706 | 4/1984 | DiMatteo et al. . |
| 4,667,112 | 5/1987 | Grossman . |
| 4,711,998 | 12/1987 | Malek ......................... 250/206.1 |
| 5,051,872 | 9/1991 | Anderson . |
| 5,105,347 | 4/1992 | Rund et al. . |
| 5,153,426 | 10/1992 | Konrad et al. . |
| 5,227,632 | 7/1993 | Armstrong et al. . |
| 5,309,339 | 5/1994 | Webb . |
| 5,393,970 | 2/1995 | Shau et al. . |
| 5,440,116 | 8/1995 | Bolander et al. . |
| 5,471,053 | 11/1995 | Diner et al. . |
| 5,510,893 | 4/1996 | Suzuki . |
| 5,519,534 | 5/1996 | Smith et al. . |
| 5,532,473 | 7/1996 | Chin . |
| 5,556,189 | 9/1996 | Wallis . |

FOREIGN PATENT DOCUMENTS

516361  1/1940  United Kingdom .

*Primary Examiner*—F. L. Evans
*Attorney, Agent, or Firm*—Pretty, Schroeder & Poplawski

[57] ABSTRACT

A quadrant light detector that employs the concept of constructed occlusion to improve its accuracy and by incorporating baffles within the design to improve its detection response to incoming light having an incidence angle near the horizon, and to divide a diffusely reflective cavity into quadrants. The quadrant detector is able to determine the direction, or azimuth and elevation, to the light source anywhere within a sector of a hemisphere or a sphere.

19 Claims, 4 Drawing Sheets

QUADRANT LIGHT DETECTOR

BACKGROUND OF THE INVENTION

The present invention relates generally to devices for determining the incoming direction of incident light and, more particularly, to devices that determine the incoming direction of incident light over a sector using a relatively small number of optical elements.

In a number of situations, it is desirable to know the direction of incidence of light from a light source. One such situation arises in the entertainment arena. It is often desirable for a virtual reality simulator to include a light detector that determines the direction of incoming light. Current virtual reality systems typically involve the use of complicated positional detectors that follow relatively complex focusing or alignment procedures.

One such position detector employs a photodiode or charge-coupled device (CCD) array having multiple discrete sensing elements. Another such position detector uses a slit positioned to direct the incident light onto different optical elements depending on the angle of incidence of the light. In this system, Gray-coded multi-element arrays assess the angle of incidence of the laser light. While devices of this nature do provide positional information, they have a number of disadvantages. For one, they provide directional information or resolution about only one axis, which is aligned with the slit, and therefore, two such devices are necessary to provide dual axis resolution. Further, the detector's accuracy is dependent on the amount of optical elements in the arrays and, if CCD elements are used in the array, the detector's dynamic range is inherently limited. In light of the above, such devices are relatively expensive and complex.

Another position detector employs a variety of separate discrete optical elements, each of which corresponds to a different angle of incidence of the light. The detector has a large number of elements, each of which is sensitive to a particular azimuth and elevation in the context of a polar coordinate system. Such a detector, if it is to provide high resolution, necessitates a relatively large number of optical elements, since its accuracy is directly proportional to the number of elements utilized. However, due to, among other things, the amount of detectors involved, and the electrical system that processes and analyzes the positional information furnished by the optical elements, such systems are relatively expensive and complex.

It should, therefore, be appreciated that there exists a definite need for a relatively simple and cost effective device that can determine incoming direction of incident light from virtually any direction within a hemisphere or sphere without a large number of optical elements or complex processing electronics. The present invention addresses this need.

SUMMARY OF THE INVENTION

The present invention, which addresses this need, resides in a detector for determining the position of a light source with respect to the orientation of the light detector.

In one embodiment of the invention, the light detector includes a base, a diffusely reflective baffle, and opaque mask, and a plurality of light sensors. The base has a surface formed of a diffusely reflective material. The baffle is also formed of a diffusely reflective material and, together with the base, defines a plurality of diffusely reflective regions. The opaque mask is spaced a predetermined distance away from the reflective regions by the baffle and it occludes a

2 portion of incident light directed toward the reflective regions. Each light sensor is associated with a separate reflective region, is responsive to incident light and generates a response signal based on the intensity of light incident on their respective reflective region.

In a more detailed feature of the invention, the reflective regions are formed by four quadrants of a hemispherical cavity. Also, the opaque mask has a surface that faces the sensors and that diffusely reflects light toward the sensors.

In another embodiment of the present invention resides in a device for determining the incoming direction of incident light comprising a base, a mask, and a baffle. The base defines a substantially light reflective surface configured to receive the incident light. The mask is situated a predetermined distance above the surface and has a plurality of light detectors which are each adapted to generate a signal that is indicative of the intensity of incident light received by the detector. The baffle assembly situated between the mask and the surface of the base. The baffle has a light reflective surface and, together with the mask and the housing, defines a plurality of separate light receiving quadrants, each of which is occupied by one of the detectors.

In another detailed feature of the invention, the device further includes a processor, associated with the detectors, for processing signals received from the detectors and generating direction signals that are indicative of the position of the light source. Further, the reflective surface of the housing is a diffuse reflector of the Lambertian type. Also, the mask is configured and situated such that the cross-sectional area of each detector that receives the light remains substantially constant and there are two detectors. As another feature, each detector is a photodiode. Also, the baffle is substantially cross-shaped and thereby forms four quadrants Other features and advantages of the present invention should become apparent from the following description of the preferred embodiments, taken in conjunction with the accompanying drawings, which illustrate, by way of example, the principles of the invention.

DESCRIPTION OF THE PREFERRED EMBODIMENTS

As shown in the exemplary drawings, the present invention resides in a quadrant light detector 10 that determines the direction of incoming light 11 from a light source 12 without the need for complicated or expensive photodetector arrays and associated electrical processing systems. More specifically, the quadrant light detector employs the concepts of constructed occlusion and diffuse reflection to improve its response at incident angles near the horizon.

In accordance with one embodiment of the invention, shown in FIGS. 1–4, the quadrant light detector 10 includes a disk-shaped mask 14 that is situated above a base 15 having, formed in its upper flat surface, a hemispherical cavity 16. The hemispherical cavity is surrounded by a flat ring-shaped shoulder 18 and divided into four separate quadrants 20, 22, 24 and 26 by a baffle assembly 28. The mask, base cavity, and baffle assembly are all formed of a suitable diffuse reflective material such as Spectralon®. Spectralon® is a highly reflective polymeric block material manufactured and sold by Labsphere Inc., of North Sutton, N.H. Spectralon® is easily machined, very durable, and provides a highly efficient Lambertion surface having a reflectivity of over 99%, in visible or near-infrared wavelengths. A Lambertian reflective surface reflects light with a substantially uniform intensity in all directions. Alternatively, the mask, the base cavity, and/or the baffle assembly could be constructed of a suitable base material of, for example, aluminum or plastic with the reflective surfaces coated with a diffuse reflective material such as barium sulfate.

The four separate light receiving quadrants 20, 22, 24 and 26, capture incident light 11 and the captured light intensity within a given quadrant depends on the angle of incidence of the incoming light, as well as the incoming light's overall intensity at any point in time. A significant function of the hemispherical cavity 16 is to provide a diffusely reflective surface that averages the incoming light at the cavity's aperture 30 and a hemispherical shape is preferred because of its azimuthal symmetry and for its ease in construction. However, other cavity shapes are acceptable. For purposes of describing the light detector's operation, a good approximation is obtained by treating the cavity as if it were a diffusely reflective flat surface that averages the incident light in the plane of the cavity's aperture.

A photodiode 32, 34, 36 and 38, is associated with each quadrant of the hemispherical cavity. Each photodiode generates an electrical signal based on the light intensity in the respective quadrant of the cavity 16. The photodiodes are all a commercially available photodiode (PIN-040A) sold by United Detector Technologies (UDT) Sensors, Inc., of Hawthorne, Calif. Each photodiode has a responsive area of 0.8 square millimeters and a noise equivalent power (NEP) of $6 \times 10^{-15}$ Watts/(Hertz)$^{0.5}$. Such a photodiode with a relatively small responsive area, has two significant advantages, one of which is that it generally has low noise characteristics. The other is that the efficiency of the system increases as the detector/hemisphere diameter or area ration decreases, resulting in a smaller detector often having a greater sensitivity than a large detector. Using these photodiodes, the quadrant light detector's efficiency nears its asymptotic state with a hemisphere having a 1 inch diameter.

To improve their opacity, the walls baffle assembly 28 have a thickness of 3 millimeters, which is also sufficient for small holes to be bored through the baffles to accommodate small signal wires 40 that allow for electrical connection to the photodiodes from the base 15. Also, the baffles may be constructed of Spectralon® doped with barium sulfate. Further, the reflectivity of the baffles can be graded so that baffle can have an angle dependent reflectively, if needed to compensate other nonuniform effects.

The mask 14 is of circular cross-section and is composed of an opaque material, and advantageously has a diffusely reflective or Lambertian outer surface. Preferably, a transparent dome 20, made from a suitable material such as Pyrex®, encloses the mask, baffle assembly, photodiodes and base's upper side.

The ratio between the mask's diameter and the aperture's diameter, and the distance between the mask 14 and the aperture 30, are the most significant parameters in optimizing the quadrant light detector's accuracy and response efficiency. A more accurate response is obtained as the mask/aperture diameter ratio approaches one. However, the detector's response efficiency or sensitivity decreases as the mask/aperture diameter ratio approaches one because the aperture's acceptance area necessarily decreases. In the embodiment shown, the mask's diameter is 1.8 inches and the aperture's diameter is 2.0 inches, which results in a mask/aperture diameter ratio of approximately 0.9 or 90%. A mask/aperture diameter ratio of 0.9 provides a relatively uniform response while maintaining an acceptable sensitivity. Further, the disk-shaped mask is spaced away from the aperture by 0.2 to 0.3 inches, which results in a mask distance to aperture diameter ratio of approximately 0.1 or 10% to 0.15 or 15%.

Figure 5A:
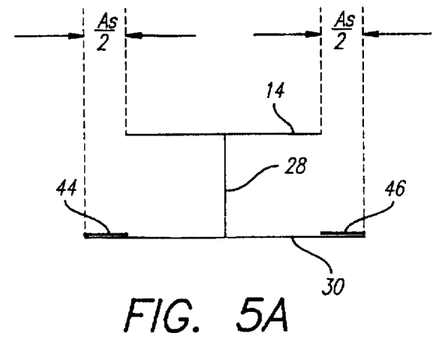
FIG. 5A is a schematic diagram of a mask, baffle and photodiode, in accordance with the present invention, illuminated by light incident at an angle normal to the photodiode's surface.
Figure 5B:
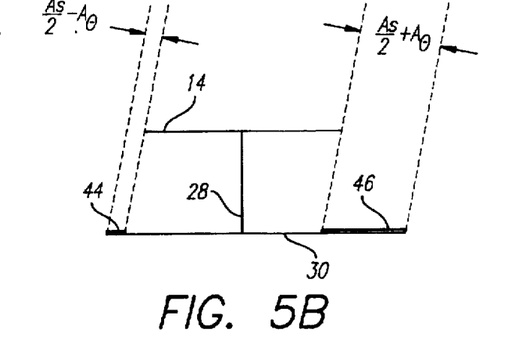
FIG. 5B is a schematic diagram of a mask, baffle and photodiode, in accordance with the present invention, illuminated by light incident at a relatively small angle from the normal to the photodiode's surface.

With reference to FIGS. 5A and 5B, the light detector 10 takes advantage of a technique called constructed occlusion to reduce the cosine dependence of the detector's response. In the occlusion technique, the mask's diameter is slightly less than the aperture's diameter. When the light is incident at an angle normal to the planes of the mask 14 and the aperture 30, only the incident light not intercepted by the mask reaches the aperture, as indicated by two regions, 44 and 46 each having a width of $A_r/2$ (FIG. 5A). The total cross-sectional width of the two regions is $A_r$. As the angle of the incident light increases from the normal direction, the cross-sectional width of the light in the first region decreases by $A_\theta$, while the cross-sectional width of the light in the second region increases by $A_\theta$ (FIG. 5B). Accordingly, as long as a portion of the mask's shadow remains on the photodiode, the decreasing incident light in the first region is compensated by the increasing incident light in the second region, so that the combined or total cross-sectional width of incident light in both regions on the aperture remains at approximately $A_r$. More specifically, as the angle of incident light increases even further from the normal direction, the first region eventually disappears and the occluded region, or the region under the mask's shadow decreases as it moves off the aperture, causing the second region to further increase. Accordingly, the increasing second region nearly compensates for the cosine effect as the mask's shadow moves off the aperture. Thus, when the mask's diameter is appropriately sized and spaced from the photodiode, the total captured incident light remains nearly constant for all incident light angles except at angles near the horizon or nearly parallel with the plane of the aperture. At the angles near the horizon, where the mask's shadow is no longer on the photodiode, the constructed occlusion effect of the mask ceases and, accordingly, the cross-sectional width of the incident light on the aperture is again cosine dependent.

Figure 5C:
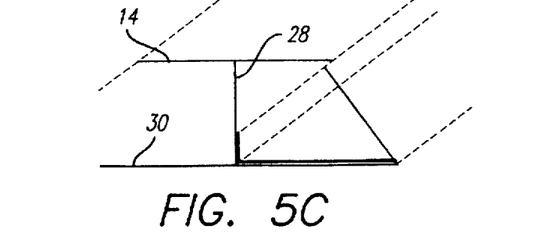
FIG. 5C is a schematic diagram of a mask, baffle and photodiode, in accordance with the present invention, illuminated by light incident at a relatively large angle from the normal to the photodiode's surface.

The aperture's cosine dependent cross-sectional width for angles near the horizon is compensated by the baffle assembly 28. As shown in FIG. 5C, four generally orthogonal planar baffle walls form a vertical cross-like structure that defines the cavity's quadrants. The baffles generally restrict the incident light to the quadrant that it enters as the incident light passes through the aperture. Although planar baffle walls are generally desired, the baffles could conceivably have curved walls. The baffle assembly allows detection of light incident at angles near the horizon by intercepting it and diffusely reflecting it toward the mask 14 and the aperture 30. Preferably, the distance between the aperture and the mask is selected such that, for light incident at angles near the horizon, the cross-sectional area of the baffle assembly is nearly equal to the nonoccluded region or area $A_s$ of the aperture, defined when light is incident at angles near to normal direction.

The base's shoulder 18 (FIGS. 3 and 4) improves the forward sensitivity of the light detector 10 and reduces its sensitivity to light incoming from below the horizon. The shoulder diffusely reflects light incoming from above the horizon so that some of it reaches the mask 14, and eventually, the photodiodes, and the shoulder blocks incoming light from below the horizon that would otherwise reach the mask and/or photodiode in the shoulder's absence. The collection efficiency of the quadrant light detector of the present invention is shown in FIG. 6.

The accuracy of the quadrant light detector's direction response can be empirically optimized using a variety of parameters. For example, the height, relative diameter, thickness, and reflectivity of the mask 14, the width and reflectivity of the shoulders 18, the height and reflectivity of the baffle assembly 28, the shape and reflectivity of the cavity 16, and the photodiode's diameter, all affect the light detector's directional response. Conversely, the detector's direction response can be tailored to be nonuniform, if desired, by varying specific parameters. For example, decreasing the distance between the mask and the aperture will decrease the spherical sector of the detectors response, while increasing the detector's efficiency. When the mask is placed in the plane of the aperture, the detector's efficiency improves to about 90%, compared to about 40% with a mask above the aperture (FIG. 6), but its response sector is narrowed. Further, the light detector's spectral response can be tailored by using spectrally selective paint on the diffusely reflective surfaces.

Figure 6:
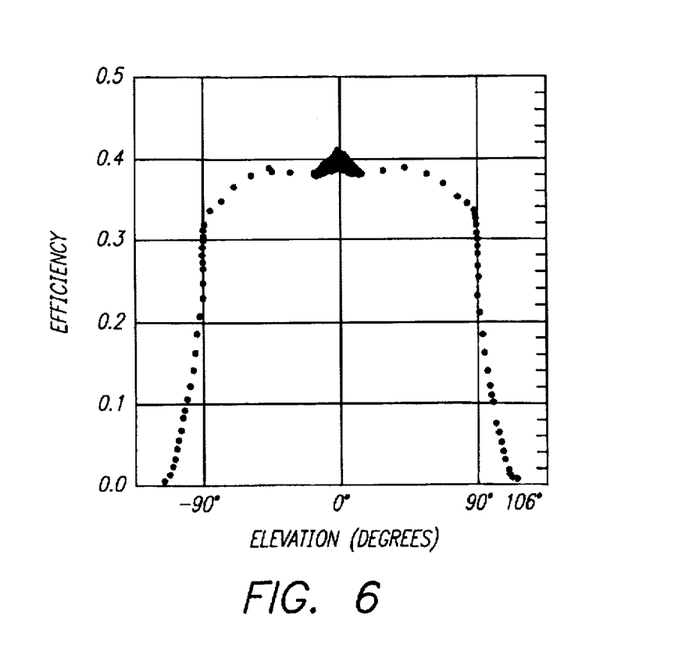
FIG. 6 is a graph of the collection efficiency of the quadrant hemispherical light detector of FIGS. 1–4.
Figure 7:
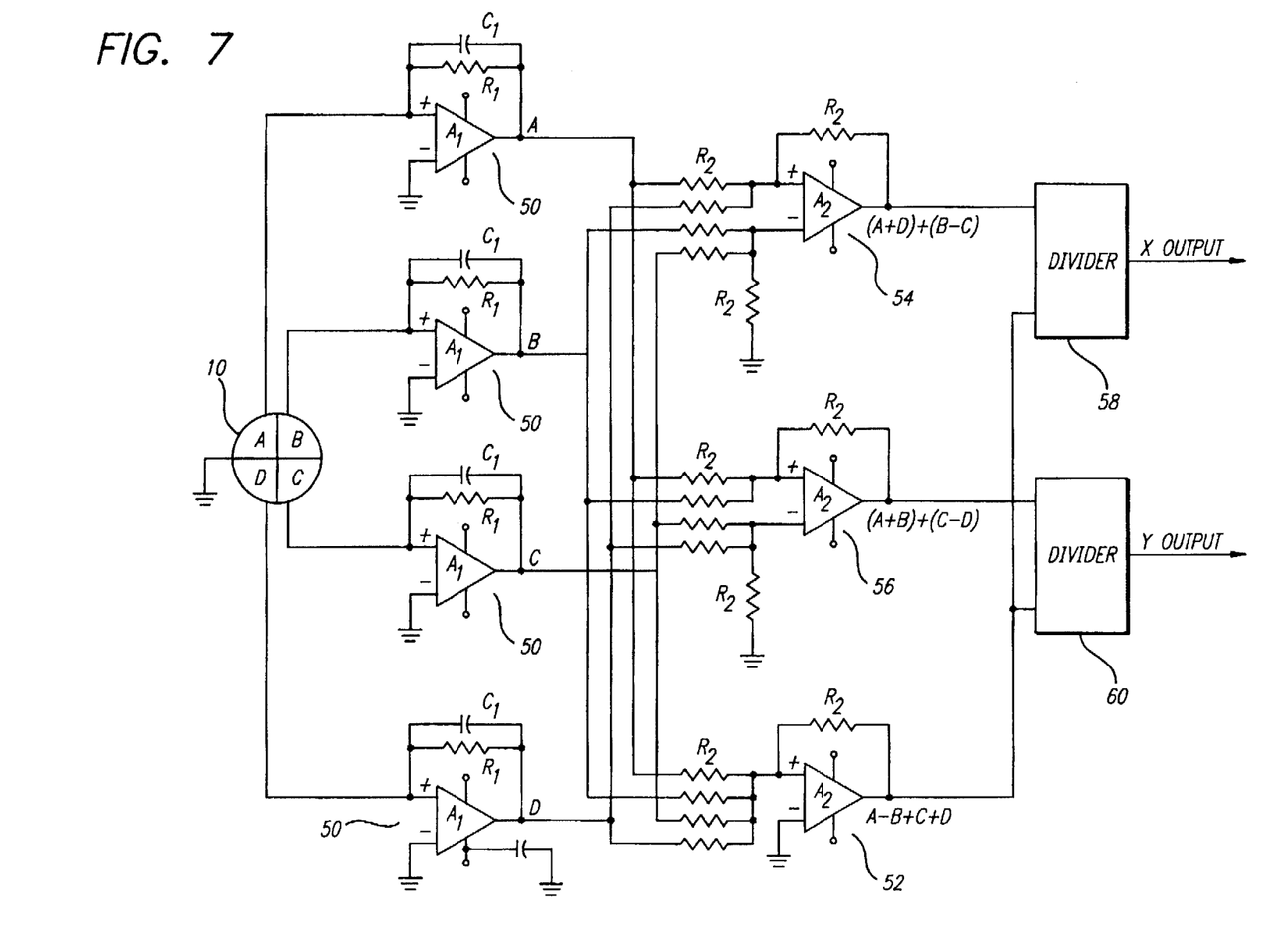
FIG. 7 is a schematic diagram of the electronics for converting electrical signal from the quadrant hemispherical light detector of FIGS. 1–4, to X–Y coordinates for displaying the direction of incoming light on the display.

The incoming direction of the incident light is determined by the processing circuit 48 shown in FIG. 6. The circuit is equivalent to the circuit suggested by UDT Sensors for use with its quad-cell photodiodes. Briefly, the quadrants are labeled A-D, in clockwise order starting with the upper left-hand quadrant. The cathodes of the photodiodes are all connected to a common ground terminal. The anodes of the respective photodiodes are each connected to the respective current-to-voltage amplifier 50. The voltages are then summed and/or subtracted by one of three amplifiers 52, 54 and 56. The first amplifier 52 outputs a signal which is the sum of the signals from all four quadrants, A-D. The second amplifier 54 sums the signals from the left quadrants, A and D, and subtracts the sum of the signals from the right quadrants, B and C. The second amplifier's output signal is then divided by the first amplifier's output signal by a divider 58 that provides an X output signal. A third amplifier 56 sums the signals from the upper quadrants, A and B, and subtracts the sum of the signals from the lower quadrants, C and D. The third amplifier's output signal is then divided by the first amplifier's output signal by a divider 60 that provides a Y output signal. A suitable divider is the DIV100 manufactured and sold by Burr-Brown® of Tucson, Ariz.

The relationship between the X and Y output signals and the quadrant signals is given by the following formulas:

$$X=[(A+D)-(B+C)]/(A+B+C+D)$$

$$Y=[(A+B)-(C+D)]/(A+B+C+D)$$

Figure 1:
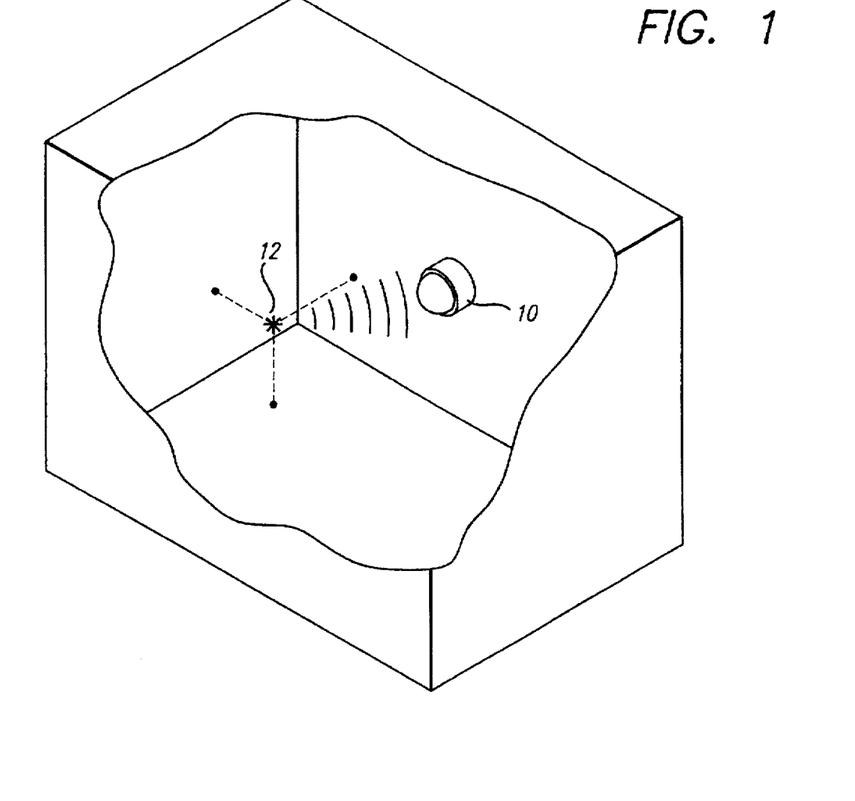
FIG. 1 is a perspective view of a quadrant hemispherical light detector, in accordance with the present invention, for determining the direction of incoming light from a light source.
Figure 2:
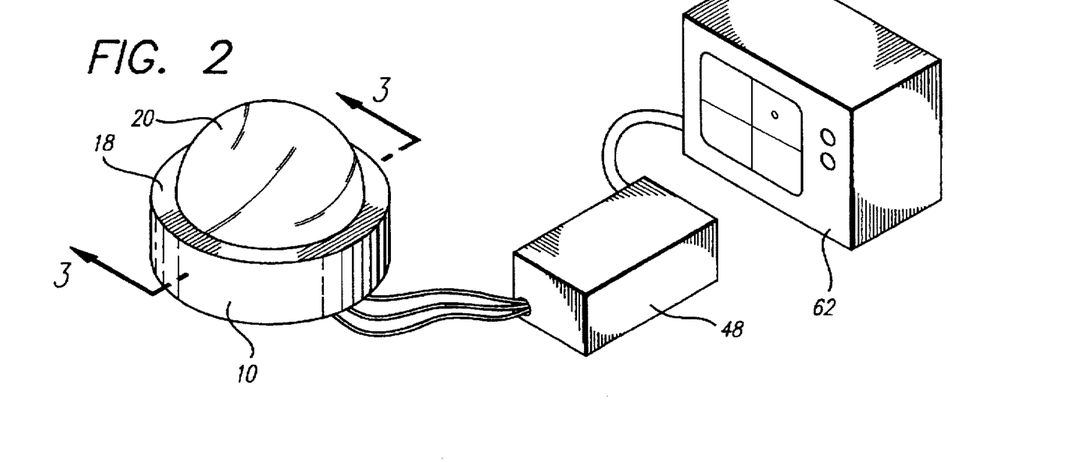
FIG. 2 is a perspective view of the quadrant hemispherical light detector of FIG. 1, connected to processing electronics and a display.
Figure 3:
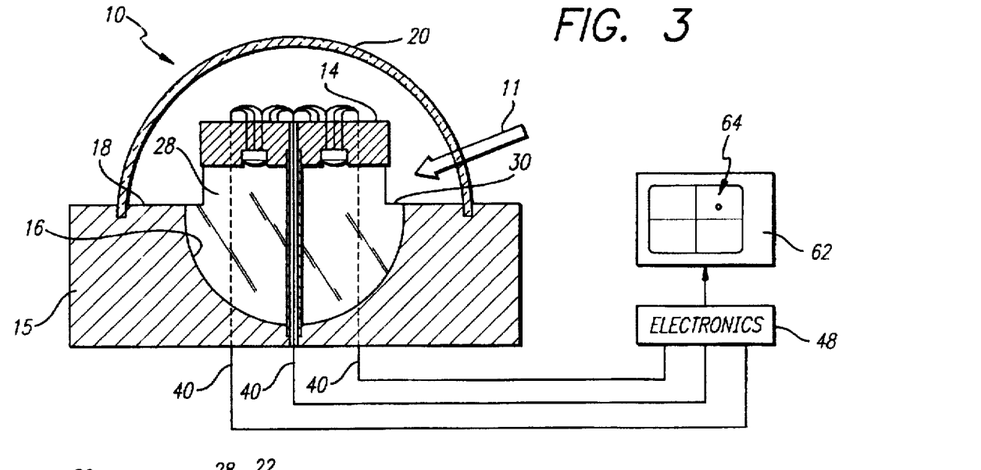
FIG. 3 is a cross-sectional view of the quadrant hemispherical light detector taken along the line 3—3 of FIG. 2, with a block diagram showing connection to the processing electronics and display of FIG. 2.

The X and Y output signals can then be connected to a suitable display 62, such as an oscilloscope (FIGS. 2 and 3). The X output signal is connected to the oscilloscope's horizontal sweep input terminal and the Y output signal is connected to the oscilloscope's vertical sweep input terminal. The oscilloscope's spot 64 indicates the azimuth and elevation of the incoming light. For example, the direction for the incident light associated with the spot indicated on the display (FIG. 2) is an azimuth of about 45 degrees and an elevation of about 45 degrees.

The azimuth (Az), taking into account the appropriate quadrant, can be calculated from the X and Y output signals using the following formula:

$$Az=\tan^{-1}(Y/X)$$

The elevation is related to the radial distance between, in this example, the center of the oscilloscope 62 and the spot 64. This radial distance or length is calculated from the X and Y output signals using the following formula:

$$R=(X^2+Y^2)^{1/2}$$

The actual elevation associated with the calculated azimuth $A_z$ and radial length is a complex function of the detector geometry. Accordingly, a look-up table, based on the light detector of FIG. 3, is given in Appendix A.

Figures 4, 8:
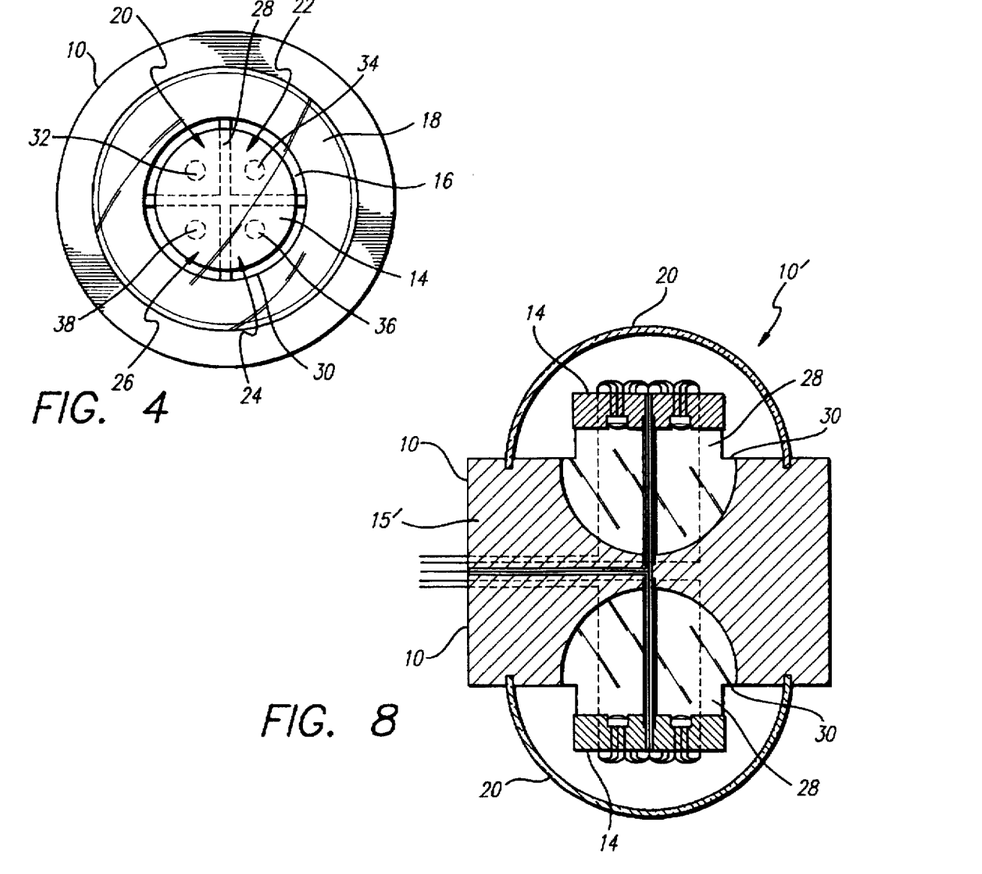
FIG. 4 is a plan view of the quadrant hemispherical light detector of FIGS. 1–3.
FIG. 8 is a cross-sectional view of a quadrant spherical light detector, in accordance with the present invention, for determining the direction of incoming light from a light source from virtually any direction.

Another embodiment of the quadrant light detector 10 of the present invention is shown in FIG. 8. This embodiment is formed by placing two quadrant hemispherical light detectors 10, such as those shown in FIGS. 1-4, back-to-back, to provide full spherical coverage.

Thus, the quadrant light detector 10 of the present invention provides a relatively simple and cost effective device that can determine the incoming direction of incident light from virtually any direction within a hemisphere or a sphere without a large number of optical elements or complex processing electronics.

Although the foregoing discloses the presently preferred embodiments of the present invention, it is understood that the those skilled in the art may make various changes to the preferred embodiments shown and described without departing from the scope of the invention. The invention is defined only by the following claims.

Lookup Table for QHD

| Azimuth | Length | Elevation |
|---|---|---|
| 0 | 1.0000 | 0 |
| 0 | 0.9640 | 10 |
| 0 | 0.9345 | 20 |
| 0 | 0.8853 | 30 |
| 0 | 0.8304 | 40 |
| 0 | 0.7945 | 50 |
| 0 | 0.7364 | 60 |
| 0 | 0.6894 | 70 |
| 0 | 0.3913 | 80 |
| 0 | 0.0000 | 90 |
| 10 | 1.0154 | 0 |
| 10 | 0.9663 | 10 |
| 10 | 0.9381 | 20 |
| 10 | 0.9151 | 30 |
| 10 | 0.8871 | 40 |
| 10 | 0.8701 | 50 |
| 10 | 0.8498 | 60 |
| 10 | 0.7762 | 70 |
| 10 | 0.4191 | 80 |
| 10 | 0.0000 | 90 |
| 20 | 1.0642 | 0 |
| 20 | 0.9320 | 10 |
| 20 | 0.9017 | 20 |
| 20 | 0.8712 | 30 |
| 20 | 0.8620 | 40 |
| 20 | 0.8290 | 50 |
| 20 | 0.7970 | 60 |
| 20 | 0.7253 | 70 |
| 20 | 0.4896 | 80 |
| 20 | 0.0000 | 90 |
| 30 | 1.1547 | 0 |
| 30 | 0.8983 | 10 |
| 30 | 0.8408 | 20 |
| 30 | 0.8306 | 30 |
| 30 | 0.8028 | 40 |
| 30 | 0.7943 | 50 |
| 30 | 0.7576 | 60 |
| 30 | 0.7031 | 70 |
| 30 | 0.5355 | 80 |
| 30 | 0.0000 | 90 |
| 40 | 1.3054 | 0 |
| 40 | 0.8784 | 10 |
| 40 | 0.8136 | 20 |
| 40 | 0.8122 | 30 |
| 40 | 0.8090 | 40 |
| 40 | 0.7492 | 50 |
| 40 | 0.7307 | 60 |
| 40 | 0.6978 | 70 |
| 40 | 0.5904 | 80 |
| 40 | 0.0000 | 90 |
| 50 | 1.3054 | 0 |
| 50 | 0.8784 | 10 |
| 50 | 0.8136 | 20 |
| 50 | 0.8122 | 30 |
| 50 | 0.8090 | 40 |
| 50 | 0.7492 | 50 |
| 50 | 0.7307 | 60 |
| 50 | 0.6978 | 70 |
| 50 | 0.5904 | 80 |
| 50 | 0.0000 | 90 |
| 60 | 1.1547 | 0 |
| 60 | 0.8983 | 10 |
| 60 | 0.8408 | 20 |
| 60 | 0.8306 | 30 |
| 60 | 0.8028 | 40 |
| 60 | 0.7943 | 50 |
| 60 | 0.7576 | 60 |
| 60 | 0.7031 | 70 |
| 60 | 0.5355 | 80 |
| 60 | 0.0000 | 90 |
| 70 | 1.0642 | 0 |
| 70 | 0.9320 | 10 |
| 70 | 0.9017 | 20 |
| 70 | 0.8712 | 30 |
| 70 | 0.8620 | 40 |
| 70 | 0.8290 | 50 |
| 70 | 0.7970 | 60 |
| 70 | 0.7253 | 70 |
| 70 | 0.4896 | 80 |
| 70 | 0.0000 | 90 |
| 80 | 1.0154 | 0 |
| 80 | 0.9663 | 10 |
| 80 | 0.9381 | 20 |
| 80 | 0.9151 | 30 |
| 80 | 0.8871 | 40 |
| 80 | 0.8701 | 50 |
| 80 | 0.8498 | 60 |
| 80 | 0.7762 | 70 |
| 80 | 0.4191 | 80 |
| 80 | 0.0000 | 90 |
| 90 | 1.0000 | 0 |
| 90 | 0.9640 | 10 |
| 90 | 0.9345 | 20 |
| 90 | 0.8853 | 30 |
| 90 | 0.8304 | 40 |
| 90 | 0.7945 | 50 |
| 90 | 0.7364 | 60 |
| 90 | 0.6894 | 70 |
| 90 | 0.3913 | 80 |
| 90 | 0.0000 | 90 |
| 100 | 1.0154 | 0 |
| 100 | 0.9663 | 10 |
| 100 | 0.9381 | 20 |
| 100 | 0.9151 | 30 |
| 100 | 0.8871 | 40 |
| 100 | 0.8701 | 50 |
| 100 | 0.8498 | 60 |
| 100 | 0.7762 | 70 |
| 100 | 0.4191 | 80 |
| 100 | 0.0000 | 90 |
| 110 | 1.0642 | 0 |
| 110 | 0.9320 | 10 |
| 110 | 0.9017 | 20 |
| 110 | 0.8712 | 30 |
| 110 | 0.8620 | 40 |
| 110 | 0.8290 | 50 |
| 110 | 0.7970 | 60 |
| 110 | 0.7253 | 70 |
| 110 | 0.4896 | 80 |
| 110 | 0.0000 | 90 |
| 120 | 1.1547 | 0 |
| 120 | 0.8983 | 10 |
| 120 | 0.8408 | 20 |
| 120 | 0.8306 | 30 |
| 120 | 0.8028 | 40 |
| 120 | 0.7943 | 50 |
| 120 | 0.7576 | 60 |
| 120 | 0.7031 | 70 |
| 120 | 0.5355 | 80 |
| 120 | 0.0000 | 90 |
| 130 | 1.3054 | 0 |
| 130 | 0.8784 | 10 |
| 130 | 0.8136 | 20 |
| 130 | 0.8122 | 30 |
| 130 | 0.8090 | 40 |
| 130 | 0.7492 | 50 |
| 130 | 0.7307 | 60 |
| 130 | 0.6978 | 70 |
| 130 | 0.5904 | 80 |
| 130 | 0.0000 | 90 |
| 140 | 1.3054 | 0 |
| 140 | 0.8784 | 10 |
| 140 | 0.8136 | 20 |
| 140 | 0.8122 | 30 |
| 140 | 0.8090 | 40 |
| 140 | 0.7492 | 50 |
| 140 | 0.7307 | 60 |
| 140 | 0.6978 | 70 |
| 140 | 0.5904 | 80 |
| 140 | 0.0000 | 90 |
| 150 | 1.1547 | 0 |
| 150 | 0.8983 | 10 |

-continued

Lookup Table for QHD

| Azimuth | Length | Elevation |
|---|---|---|
| 150 | 0.8408 | 20 |
| 150 | 0.8306 | 30 |
| 150 | 0.8028 | 40 |
| 150 | 0.7943 | 50 |
| 150 | 0.7576 | 60 |
| 150 | 0.7031 | 70 |
| 150 | 0.5355 | 80 |
| 150 | 0.0000 | 90 |
| 160 | 1.0642 | 0 |
| 160 | 0.9320 | 10 |
| 160 | 0.9017 | 20 |
| 160 | 0.8712 | 30 |
| 160 | 0.8620 | 40 |
| 160 | 0.8290 | 50 |
| 160 | 0.7970 | 60 |
| 160 | 0.7253 | 70 |
| 160 | 0.4896 | 80 |
| 160 | 0.0000 | 90 |
| 170 | 1.0154 | 0 |
| 170 | 0.9663 | 10 |
| 170 | 0.9381 | 20 |
| 170 | 0.9151 | 30 |
| 170 | 0.8871 | 40 |
| 170 | 0.8701 | 50 |
| 170 | 0.8498 | 60 |
| 170 | 0.7762 | 70 |
| 170 | 0.4191 | 80 |
| 170 | 0.0000 | 90 |
| 180 | 1.0000 | 0 |
| 180 | 0.9640 | 10 |
| 180 | 0.9345 | 20 |
| 180 | 0.8853 | 30 |
| 180 | 0.8304 | 40 |
| 180 | 0.7945 | 50 |
| 180 | 0.7364 | 60 |
| 180 | 0.6894 | 70 |
| 180 | 0.3913 | 80 |
| 180 | 0.0000 | 90 |
| 190 | 1.0154 | 0 |
| 190 | 0.9663 | 10 |
| 190 | 0.9381 | 20 |
| 190 | 0.9151 | 30 |
| 190 | 0.8871 | 40 |
| 190 | 0.8701 | 50 |
| 190 | 0.8498 | 60 |
| 190 | 0.7762 | 70 |
| 190 | 0.4191 | 80 |
| 190 | 0.0000 | 90 |
| 200 | 1.0642 | 0 |
| 200 | 0.9320 | 10 |
| 200 | 0.9017 | 20 |
| 200 | 0.8712 | 30 |
| 200 | 0.8620 | 40 |
| 200 | 0.8290 | 50 |
| 200 | 0.7970 | 60 |
| 200 | 0.7253 | 70 |
| 200 | 0.4896 | 80 |
| 200 | 0.0000 | 90 |
| 210 | 1.1547 | 0 |
| 210 | 0.8983 | 10 |
| 210 | 0.8408 | 20 |
| 210 | 0.8306 | 30 |
| 210 | 0.8028 | 40 |
| 210 | 0.7943 | 50 |
| 210 | 0.7576 | 60 |
| 210 | 0.7031 | 70 |
| 210 | 0.5355 | 80 |
| 210 | 0.0000 | 90 |
| 220 | 1.3054 | 0 |
| 220 | 0.8784 | 10 |
| 220 | 0.8136 | 20 |
| 220 | 0.8122 | 30 |
| 220 | 0.8090 | 40 |
| 220 | 0.7492 | 50 |
| 220 | 0.7307 | 60 |
| 220 | 0.6978 | 70 |
| 220 | 0.5904 | 80 |
| 220 | 0.0000 | 90 |
| 230 | 1.3054 | 0 |
| 230 | 0.8784 | 10 |
| 230 | 0.8136 | 20 |
| 230 | 0.8122 | 30 |
| 230 | 0.8090 | 40 |
| 230 | 0.7492 | 50 |
| 230 | 0.7307 | 60 |
| 230 | 0.6978 | 70 |
| 230 | 0.5904 | 80 |
| 230 | 0.0000 | 90 |
| 240 | 1.1547 | 0 |
| 240 | 0.8983 | 10 |
| 240 | 0.8408 | 20 |
| 240 | 0.8306 | 30 |
| 240 | 0.8028 | 40 |
| 240 | 0.7943 | 50 |
| 240 | 0.7576 | 60 |
| 240 | 0.7031 | 70 |
| 240 | 0.5355 | 80 |
| 240 | 0.0000 | 90 |
| 250 | 1.0642 | 0 |
| 250 | 0.9320 | 10 |
| 250 | 0.9017 | 20 |
| 250 | 0.8712 | 30 |
| 250 | 0.8620 | 40 |
| 250 | 0.8290 | 50 |
| 250 | 0.7970 | 60 |
| 250 | 0.7253 | 70 |
| 250 | 0.4896 | 80 |
| 250 | 0.0000 | 90 |
| 260 | 1.0154 | 0 |
| 260 | 0.9663 | 10 |
| 260 | 0.9381 | 20 |
| 260 | 0.9151 | 30 |
| 260 | 0.8871 | 40 |
| 260 | 0.8701 | 50 |
| 260 | 0.8498 | 60 |
| 260 | 0.7762 | 70 |
| 260 | 0.4191 | 80 |
| 260 | 0.0000 | 90 |
| 270 | 1.0000 | 0 |
| 270 | 0.9640 | 10 |
| 270 | 0.9345 | 20 |
| 270 | 0.8853 | 30 |
| 270 | 0.8304 | 40 |
| 270 | 0.7945 | 50 |
| 270 | 0.7364 | 60 |
| 270 | 0.6894 | 70 |
| 270 | 0.3913 | 80 |
| 270 | 0.0000 | 90 |
| 280 | 1.0154 | 0 |
| 280 | 0.9663 | 10 |
| 280 | 0.9381 | 20 |
| 280 | 0.9151 | 30 |
| 280 | 0.8871 | 40 |
| 280 | 0.8701 | 50 |
| 280 | 0.8498 | 60 |
| 280 | 0.7762 | 70 |
| 280 | 0.4191 | 80 |
| 280 | 0.0000 | 90 |
| 290 | 1.0642 | 0 |
| 290 | 0.9320 | 10 |
| 290 | 0.9017 | 20 |
| 290 | 0.8712 | 30 |
| 290 | 0.8620 | 40 |
| 290 | 0.8290 | 50 |
| 290 | 0.7970 | 60 |
| 290 | 0.7253 | 70 |
| 290 | 0.4896 | 80 |
| 290 | 0.0000 | 90 |
| 300 | 1.1547 | 0 |
| 300 | 0.8983 | 10 |
| 300 | 0.8408 | 20 |
| 300 | 0.8306 | 30 |

Lookup Table for QHD

| Azimuth | Length | Elevation |
|---|---|---|
| 300 | 0.8028 | 40 |
| 300 | 0.7943 | 50 |
| 300 | 0.7576 | 60 |
| 300 | 0.7031 | 70 |
| 300 | 0.5355 | 80 |
| 300 | 0.0000 | 90 |
| 310 | 1.3054 | 0 |
| 310 | 0.8784 | 10 |
| 310 | 0.8136 | 20 |
| 310 | 0.8122 | 30 |
| 310 | 0.8090 | 40 |
| 310 | 0.7492 | 50 |
| 310 | 0.7307 | 60 |
| 310 | 0.6978 | 70 |
| 310 | 0.5904 | 80 |
| 310 | 0.0000 | 90 |
| 320 | 1.3054 | 0 |
| 320 | 0.8784 | 10 |
| 320 | 0.8136 | 20 |
| 320 | 0.8122 | 30 |
| 320 | 0.8090 | 40 |
| 320 | 0.7492 | 50 |
| 320 | 0.7307 | 60 |
| 320 | 0.6978 | 70 |
| 320 | 0.5904 | 80 |
| 320 | 0.0000 | 90 |
| 330 | 1.1547 | 0 |
| 330 | 0.8953 | 10 |
| 330 | 0.8408 | 20 |
| 330 | 0.8306 | 30 |
| 330 | 0.8028 | 40 |
| 330 | 0.7943 | 50 |
| 330 | 0.7576 | 60 |
| 330 | 0.7031 | 70 |
| 330 | 0.5355 | 80 |
| 330 | 0.0000 | 90 |
| 340 | 1.0642 | 0 |
| 340 | 0.9320 | 10 |
| 340 | 0.9017 | 20 |
| 340 | 0.8712 | 30 |
| 340 | 0.8620 | 40 |
| 340 | 0.8290 | 50 |
| 340 | 0.7970 | 60 |
| 340 | 0.7253 | 70 |
| 340 | 0.4896 | 80 |
| 340 | 0.0000 | 90 |
| 350 | 1.0154 | 0 |
| 350 | 0.9663 | 10 |
| 350 | 0.9381 | 20 |
| 350 | 0.9151 | 30 |
| 350 | 0.8871 | 40 |
| 350 | 0.8701 | 50 |
| 350 | 0.8498 | 60 |
| 350 | 0.7762 | 70 |
| 350 | 0.4191 | 80 |
| 350 | 0.0000 | 90 |

Azimuth = ATAN(y/x)*180/PI() + IF(x < 0, 180, 0) + IF(AND(x > 0, y < 0), 360, 0)
Length = SQRT(x ^ 2 + y ^ 2)
Where
X = ((b + c) − (a + d))/(a + b + c + d)
y = ((a + b) − (c + d))/(a + b + c + d)
and a, b, c, d are quadrant responses

We claim:

1. A light detector for determining the position of a light source with respect to the orientation of the light detector, comprising:

a base having a surface formed of a diffusely reflective material;

a diffusely reflective baffle that, together with the base, defines a plurality of diffusely reflective regions;

a mask spaced a predetermined distance away from the base, the mask occluding a portion of light directed toward the reflective regions;

a plurality of light sensors, each light sensor responsively connected to receive light incident on one of said reflective regions and generating a response signal based on the intensity of light incident on its respective reflective region.

2. A light detector as defined in claim 1, wherein the reflective regions are formed by quadrants of a hemispherical cavity.

3. A light detector as defined in claim 1, wherein the surface of the mask facing the sensors diffusely reflects light toward the sensors.

4. A device as recited in claim 1, wherein the mask is opaque.

5. A device for determining the incoming direction of incident light, comprising:

a base defining a substantially light reflective surface configured to receive the incident light;

a mask situated a predetermined distance from the surface;

a plurality of light detectors which are each adapted to generate a signal that is indicative of the intensity of incident light received by the detector; and a baffle situated between the mask and the light reflective surface of the base, the base, the mask and the baffle together defining a plurality of separate light receiving sections, each of which supplies light to one of the detectors.

6. A device as recited in claim 5, further comprising a processor, associated with the detectors, for processing signals received from the detectors and generating direction signals that are indicative of the incoming direction of the incident light.

7. A device as recited in claim 5, wherein the reflective surface of the base is a diffuse reflector of the Lambertian type.

8. A device as recited in claim 5, wherein: the mask is configured and situated such that the total cross-sectional area of incident light passed to the detectors remains substantially constant over a range of elevational angles of incidence.

9. A device as recited in claim 5, wherein each detector is a photodiode.

10. A device as recited in claim 5, wherein the baffle defines quadrants.

11. A device as recited in claim 10, wherein the baffle is substantially cross-shaped.

12. A device for determining the incoming direction of light, comprising:

a base configured with a detection aperture that receives light from substantially any direction within a hemisphere;

a mask positioned in said hemisphere and spaced from said detection aperture;

a baffle positioned in said aperture between said mask and said base, said baffle dividing said aperture into regions; and a plurality of detectors, each optically coupled to generate a signal representative of illumination incident on a respective region of the aperture.

13. A device as recited in claim 12, wherein said base has a diffusely reflective cavity with said detection aperture, and said baffle divides said cavity.

14. A device as recited in claim 12, wherein said baffle includes two intersecting planar members that form four of said regions.

15. A device as recited in claim 12, wherein said mask and said baffle have diffusely reflective surfaces.

16. A device as recited in claim 12, wherein said aperture and said mask have circular cross sections.

17. A device as recited in claim 12, wherein said detectors are positioned on a side of the mask facing said aperture.

18. A device as recited in claim 12, further comprising a processor that processes said signals to generate signals indicative of incoming direction of said light.

19. A device as recited in claim 18, further comprising a display that receives said signals and displays said incoming direction.

* * * * *